UNITED STATES PATENT OFFICE.

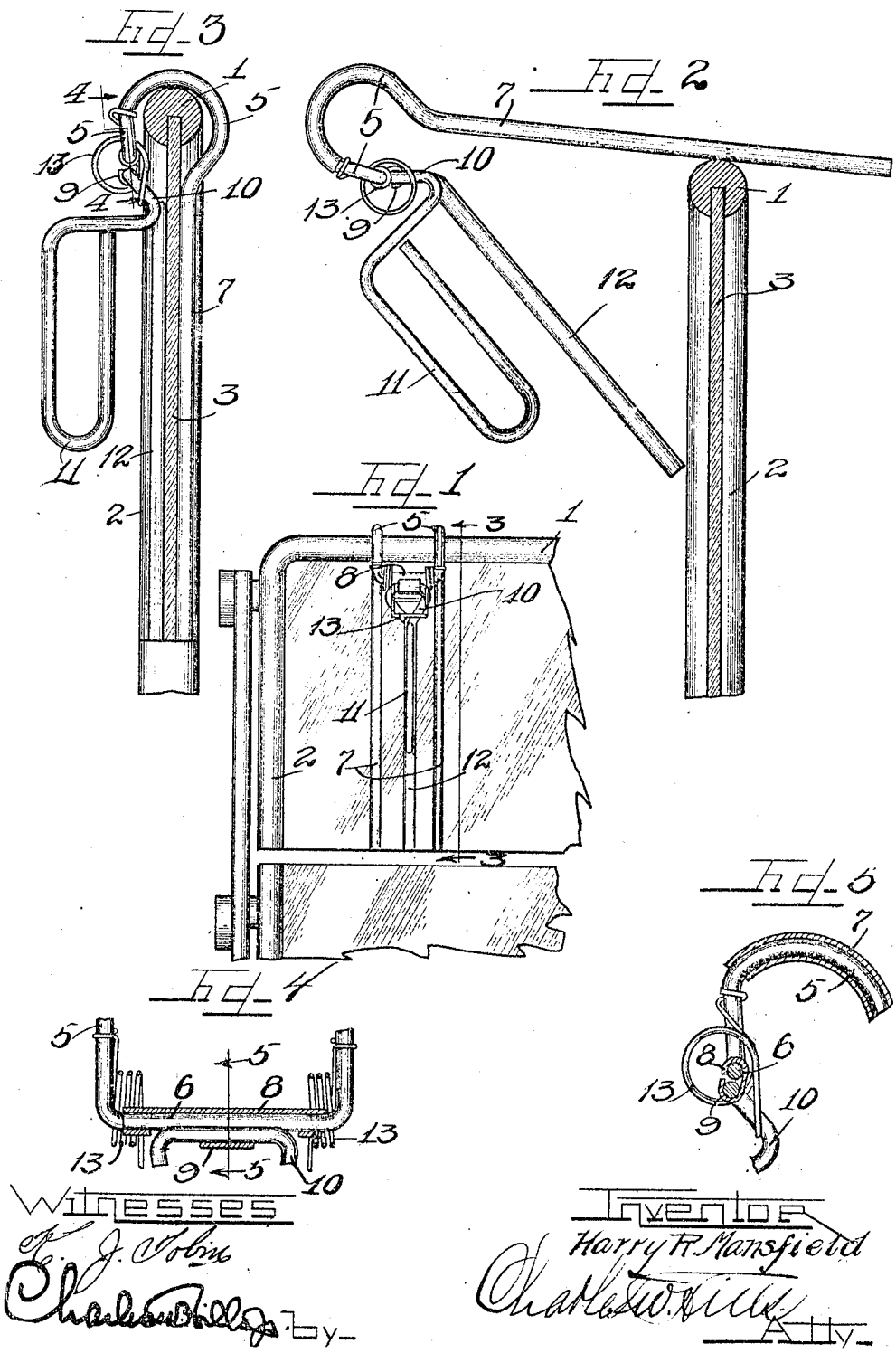

HARRY R. MANSFIELD, OF RACINE, WISCONSIN, ASSIGNOR TO RACINE HANDY MANUFACTURING COMPANY, A CORPORATION OF WISCONSIN.

WIND-SHIELD CLEANER 1,241,644.             Specification of Letters Patent.          Patented Oct. 2, 1917.

Application filed July 15, 1916. Serial No. 109,447.

*To all whom it may concern:*

Be it known that I, HARRY R. MANSFIELD, a citizen of the United States, and a resident of the city of Racine, in the county of Racine and State of Wisconsin, have invented certain new and useful Improvements in Wind-Shield Cleaners; and I do hereby declare that the following is a full, clear, and exact description of the same, reference being had to the accompanying drawings, and to the numerals of reference marked thereon, which form a part of this specification.

In cold, rainy or foggy weather automobile drivers experience considerable trouble due to the fact that the glass of the wind shield becomes frosted or covered with moisture thus obstructing the vision of the driver. This difficulty very often results in serious accidents causing damage to the automobile and injury to the occupants of the car.

This invention relates to an improved wind shield cleaner for an automobile adapted to readily fit over the horizontal upper cross bar of a wind shield frame, and having rubber covered arms to press against both surfaces of the glass of the wind shield, and provided with an inwardly directed handle for moving the cleaner laterally across the wind shield, the rubber covered arms or squeegees simultaneously cleaning both surfaces of the wind shield glass.

It is furthermore an object of this invention to construct a wind shield cleaner comprising spring controlled rubber covered arms adapted to press against the surfaces of the wind shield glass and to be moved across said surfaces by means of a handle integral with one of said arms and disposed conveniently for actuation by the driver of the car.

It is finally an object of this invention to construct a wind shield cleaner consisting of a few parts and adapted to be movably mounted on a wind shield to clean both surfaces of the glass simultaneously.

The invention (in a preferred form) is illustrated in the drawings and hereinafter more fully described.

In the drawings:

Figure 1 is a fragmentary interior view of an upper corner of a wind shield, having mounted thereon a wind shield cleaner embodying the principles of my invention.

Fig. 2, is a lateral vertical section of the upper portion of a wind shield, showing a side elevational view of the device with parts in open position as the device is mounted on the wind shield.

Fig. 3 is a section taken on line 3—3 of Fig. 1.

Fig. 4 is a section taken on line 4—4 of Fig. 3, with parts shown in elevation and with the wind shield omitted.

Fig. 5 is a section taken on line 5—5, of Fig. 4, and showing a section of the rubber covering of part of one of the members of the device.

As shown in the drawings:

The reference numeral 1, represents the horizontal member of the upper half 2, of a wind shield frame of an automobile, said upper half of the frame 2, having a plate of glass 3, mounted therein in any suitable manner. Removably mounted on the frame 2, is a wind shield cleaner embodying the principles of this invention and comprising a pair of outer parallel metal arms 4, the upper ends of each thereof bent to afford hooks or curved portions 5, which are integrally connected to one another by a cross-bar 6, thus permitting said arms, hooks and cross-bar to be formed from a single rod or heavy wire.

Slipped over each of the arms and its respective hook 5, is a rubber casing or tube 7, the upper end of which terminates a short distance from the end of the hook 5, above the cross bar 6, and the lower end being practically flush with the lower end of the arm though not necessarily so.

A metal plate is bent around and rigidly secured to the cross-bar 6, to form a short tube like member 8, having portions cut therefrom to afford an integral centrally disposed hook or hanger 9. A unitary piece of metal rod or heavy wire is bent at approximately its center to form a loop 10, and one end of said rod at one side of said loop is bent outwardly at an angle therefrom and then downwardly and upwardly to form a handle 11, while the other end of said rod is slightly bent out of the plane of said loop 10, and is left straight to form an inner or middle arm which is covered by a rubber casing or tube 12. A spring wire is bent around the loop 10, and around both ends of the tube 8, to afford a double spring 13, the ends of which are secured to the loops 5, a short distance above the cross-bar 6, to cause tensioning of said spring when said middle arm is pulled away from the arms 4 by means of the handle 11.

The operation is as follows:

When the wind shield cleaner is not mounted on a wind shield the action of the double spring 13, tends to thrust the middle arm, and the handle 11, between the arms and extending therebeyond at an angle. When it becomes necessary to mount the cleaner upon the wind shield, this may be done by opening the device to a position as shown in Fig. 2. The arms covered with the tubes 7, may then be slipped over the horizontal portion 1, of the wind shield frame until the hook portions 5, engage around the top rail 1, of the frame, in which position the handle 11, may be released, allowing the spring 13, which has been tensioned by the separation of the parts to thrust the middle arm, and the arms against the rear and front surfaces respectively of the wind shield glass 3, as shown in Fig. 3. By gripping the handle 11, and exerting a lateral force thereon the wind shield cleaner may be moved across the wind shield, the rubber squeegees 7 and 12, pressing against the surfaces of the glass 3, and by their movement cleaning the surfaces of the glass of any sleet or moisture which may have collected thereon, and operating on both surfaces of the blass simultaneously.

I am aware that various details of construction may be varied through a wide range without departing from the principles of this invention and I therefore do not purpose limiting the patent granted otherwise than necessitated by the prior art.

I claim as my invention:

1. In a device of the class described for cleaning an automobile wind shield, a pair of parallel arms, a hook formed on the upper end of each of said arms, a cross bar connecting the ends of said hooks, a hanger secured on said cross bar, a loop engaged on said hanger, a middle arm integral with one side of said loop, a handle for actuating the device integral with the other side of said loop, rubber tubes on said arms, and a spring engaging said loop and coiled around each end of said cross bar with the ends of said spring secured to said hooks.

2. In a device of the class described, unitary means comprising parallel rubber covered arms, a hook formed on the upper end of each of said arms, and a cross bar connecting said hooks, a hanger secured to said cross bar, a second unitary means comprising a loop for engaging said hanger, a rubber covered arm, and a handle, and a spring engaging both of said unitary means and said hanger to hold said arms pressed against the surfaces of the glass of a wind shield to permit simultaneous cleaning of said surfaces when said device is moved across the wind shield by said handle.

3. A wind shield cleaner comprising a plurality of arms, a hoop formed at the upper end of each arm, a rubber tube investing each arm and hook, a cross bar connecting the hooked ends of the arms, an arm pivoted to said bar, a coiled spring secured on the bar acting to draw the pivoted arm toward the first named arms and a handle for actuating the cleaner.

In testimony whereof I have hereunto subscribed my name in the presence of two subscribing witnesses.

HARRY R. MANSFIELD.

Witnesses:
WILLIAM H. F. WARD,
ERNEST LEE PARKER.